United States Patent
Carr et al.

(10) Patent No.: US 6,809,848 B2
(45) Date of Patent: Oct. 26, 2004

(54) MEMS DEVICE

(75) Inventors: Charles D Carr, Orefield, PA (US); Lu Fang, Orefield, PA (US); Dhiraj H Malkani, Breinigsville, PA (US)

(73) Assignee: Agere Systems Inc., Allentown, PA (US)

( * ) Notice: Subject to any disclaimer, the term of this patent is extended or adjusted under 35 U.S.C. 154(b) by 11 days.

(21) Appl. No.: 09/872,306

(22) Filed: Jun. 1, 2001

(65) Prior Publication Data

US 2002/0181847 A1 Dec. 5, 2002

(51) Int. Cl.[7] .............................................. G02B 26/08
(52) U.S. Cl. ........................................ 359/223; 359/226
(58) Field of Search ..................... 385/18, 14; 359/223, 359/224, 225, 226; 310/309

(56) References Cited

U.S. PATENT DOCUMENTS

| | | | | |
|---|---|---|---|---|
| 5,952,712 A | * | 9/1999 | Ikuina et al. | 257/678 |
| 5,995,688 A | | 11/1999 | Aksyuk et al. | 385/14 |
| 6,108,464 A | * | 8/2000 | Foresi et al. | 385/14 |
| 6,284,656 B1 | * | 9/2001 | Farrar | 438/687 |
| 6,329,607 B1 | * | 12/2001 | Fjelstad et al. | 174/261 |
| 6,360,035 B1 | * | 3/2002 | Hurst et al. | 385/18 |
| 6,393,187 B1 | * | 5/2002 | Engelberth et al. | 385/115 |
| 6,433,411 B1 | * | 8/2002 | Degani et al. | 257/678 |

FOREIGN PATENT DOCUMENTS

JP         09-261975        * 10/1997    ............ H02N/1/00

OTHER PUBLICATIONS

Yoshihiko Imanaka et al, "Thin Film Metallization for Aluminum Nitride", *Electroceramics in Japan III*, 2000, pp.129–134.

Lin et al, "On the Expandability of Free–Space Micromachined Optical Cross Connects," *Journal of Lightwave Technology*, vol. 18, pp 482–489 (Apr. 2000).

Lin et al, "Free–Space Micromachined Optical Switches for Optical Networking," *IEEE Journal of Selected Topics in Quantum Electronics*, vol. 5, pp 4–9 (Jan./Feb. 1999).

Hecht, J., All Optical Networks Need All Optical Switches, *Laser Focus World*, pp189–196 (May 2000).

* cited by examiner

*Primary Examiner*—Drew A. Dunn
*Assistant Examiner*—Joshua L Pritchett

(57) ABSTRACT

The invention is a device and method of fabrication where an array of electrostatically activated members of (e.g., movable mirrors) formed in a layer comprising silicon is mounted over a ceramic substrate. The substrate includes conductors formed on a major surface and in via holes formed in the substrate. The conductors are positioned so as to selectively operate the array of mirrors.

17 Claims, 4 Drawing Sheets

MEMS DEVICE

FIELD OF THE INVENTION

This invention relates to Micro Electromechanical Systems (MEMS) devices

BACKGROUND OF THE INVENTION

Micro Electromechanical Systems (MEMS) devices, in particular, MEMS mirror arrays, are currently receiving a great deal of attention as the central component of high capacity optical switches for telecommunications applications. Such a switch can be made from a silicon chip which has formed thereon an array of tiny movable mirrors aligned with input and output fibers. In one type of switch, input beams are parallel to the major surface of the silicon wafer, and the path of any particular incoming beam can be diverted to one of several output fibers by activating a selected mirror in the array so that it is located in the path of the beam for reflection. (See, e.g., Lin et al, "On the Expandability of Free-Space Micromachined Optical Cross Connects," Journal of Lightwave Technology, vol. 18, pp 482–489 (April 2000) and Lin et al, "Free-Space Micromachined Optical Switches for Optical Networking," IEEE Journal of Selected Topics in Quantum Electronics, vol. 5, pp. 4–9 (January/February 1999).) In another type of switch, the mirrors can be rotated in two axes simultaneously, the light is directed at the array at a near normal angle to the silicon, and each mirror is capable of directing a dedicated input beam to any one of the output fibers by an appropriate rotation of the selected mirror. (See, e.g., Hecht, "All Optical Networks Need All Optical Switches, Laser Focus World, pp 189–196 (May 2000).) MEMS devices can also be combined with a silicon optical bench device to provide a switching function for the optical bench device. (See, e.g., U.S. Pat. No. 5,995,688 issued to Aksyuk et al.)

The mirror array is currently formed on a silicon wafer which also includes conductors for applying a bias to the selected mirrors. Fabrication of the device tends to be complex and time-consuming since it usually involves, among other things, via etching of the wafer and conductor back-filling of the vias in order to provide the conductor pattern and package the device.

It is desirable, therefore, to provide a MEMS device and method of fabrication which is simplified yet robust and can accommodate the need for conductor definition in large arrays.

SUMMARY OF THE INVENTION

The invention in accordance with one aspect is a device comprising an array of electrostatically activated members (e.g., mirrors) formed in a layer comprising silicon, and a substrate comprising a ceramic material and including conductors formed on a major surface of the substrate and in via holes formed in the substrate, the conductors being positioned so as to selectively operate the array of members.

The invention in accordance with another aspect is a method of forming a device comprising forming an array of electrostatically activated members (e.g., mirrors) in a layer of silicon, and mounting said silicon layer over a substrate comprising a ceramic material which includes conductors formed on a major surface of the substrate and in via holes formed in the substrate. The silicon layer is mounted so as to position the members with respect to the conductors to permit selective operation of the members.

BRIEF DESCRIPTION OF THE FIGURES

These and other features are delineated in detail in the following description. In the drawing.

It will be appreciated that, for purposes of illustration, these figures are not necessarily drawn to scale.

DETAILED DESCRIPTION

Figure 1:
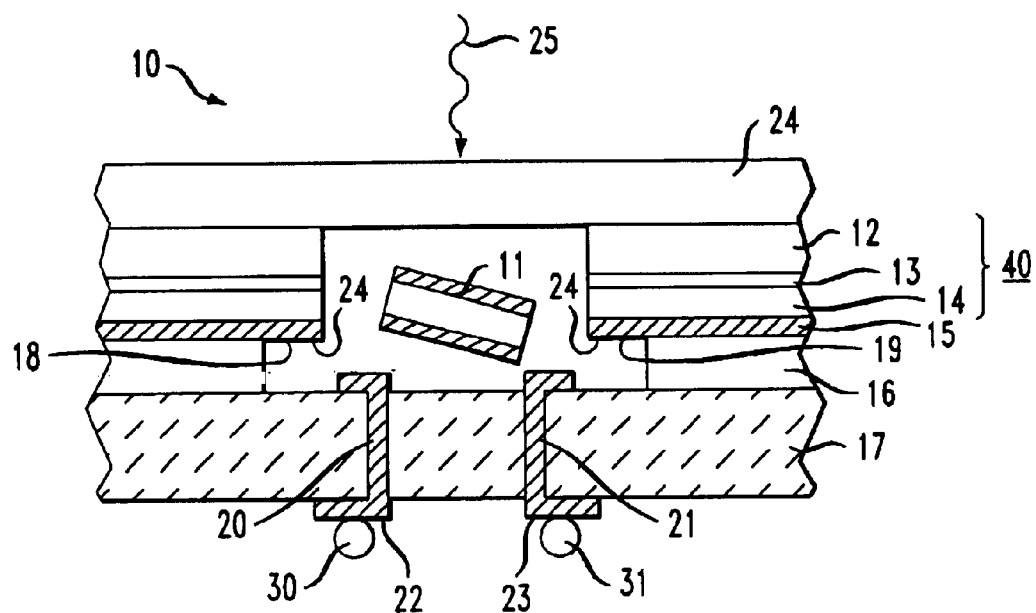
FIG. 1 is a cross sectional schematic view of a portion of a MEMS device according to an embodiment of the invention.
Figure 2:
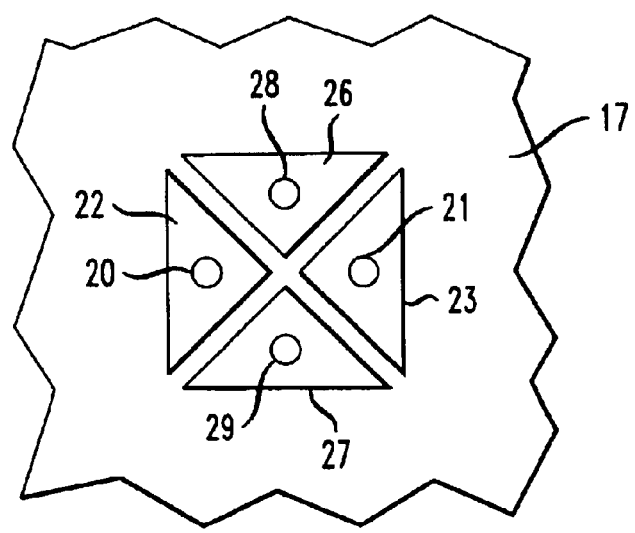
FIG. 2 is a plan view of a portion of the device illustrated in FIG. 1.

FIGS. 1 and 2 illustrate portions of one device which can utilize the principles of the invention. The device, 10, is a Micro Electrical Mechanical Systems (MEMS) device which includes an array of movable mirrors, one of which is shown as 11. It will be appreciated that, while only one mirror is shown for illustrative purposes, the device typically includes a large array of such mirrors. The invention appears most advantageous for arrays of at least 8×10. As known in the art, these mirrors are formed in the surface of a silicon substrate which includes a wafer, 12, of silicon, a layer, 13, of oxide, another layer, 14, of silicon, and a layer, 15, of metal formed on most of the surface thereof. (Layers, 12, 13, and 14 are usually considered part of a single wafer 40). A portion of the layer, 15, can be used to form supporting structures for the mirror, 11, which structures are not visible in the cross sectional view of FIG. 1. In this particular example, the mirror, 11, is capable of tilting about two axes, one running in and out of the page and one running parallel to the page of FIG. 1. The invention should also be applicable to the "pop-up" variety where the mirror rotates about a single axis. Preferably, the light, represented by arrow, 25, is incident on the mirror array through a window, 24, comprising glass.

A spacer layer, 16, is formed over a surface of the wafer 40. The spacer layer, 16, mechanically separates the wafer, 40, from a substrate, 17, and can be any material which provides the desired spacing. The spacing layer thickness is chosen to optimize electrostatic operation of the mirror, 11, and can be easily determined by the skilled artisan.

The wafer 40 and spacer layer, 16, are mounted on a ceramic substrate, 17. The ceramic substrate is typically an AIN material. The substrate includes a pattern of conductors, e.g., 22 and 23, which are formed on both major surfaces, and via holes, e.g., 20 and 21, through which at least selected conductors extend. A full array of conductors for an individual mirror is shown in the plan view of FIG. 2. It will be noted that the conductor array, in addition to the conductors, 22 and 23, and their associated via holes, 20 and 21, shown in FIG. 1, also includes conductors, 26 and 27, with their associated via holes, 28 and 29. The pattern of the conductors shown is not critical to the invention. The conductors, 22, 23, 26, and 27, serve, when appropriately biased, to provide an electrostatic field which rotates the mirror, 11, by a desired amount. The conductors may be electrically connected and mechanically bonded to a standard connector (not shown), such as the Megarray® connector sold by Berg Electronics, by means of solder bumps, 30 and 31. Alternatively, electrical connection can be provided by pins (not shown) brazed to the conductors to form a pin grid array.

It should be appreciated that for large mirror arrays (at least 8×10) a fairly dense pattern of conductors and via holes is normally required. In some applications, a line width and spacing of less than 2 microns for the conductors is desirable. However, the processes for fabricating the ceramic substrate conductor pattern include hole punching, trace printing, lamination, firing, and polishing which are more mature and easier to control than conductor fabrication through a silicon substrate normally used for MEMS devices. In order to provide a uniform tilt for a particular bias for all the mirrors in the array, the substrate, 17, should be flat and fairly smooth across its surface. In particular, it appears that a flatness (the difference between the highest peak and lowest valley) of less than or equal to 4 microns, and a surface roughness (the average height of protrusions on the surface) of less than or equal to 0.03 microns would be desirable. However, a flatness of less than or equal to 10 microns and a roughness of less than or equal to 1 micron would also apparently be usable. Ceramic substrates with these characteristics have been reported in Electroceramics in Japan III, pp. 129–134 (2000). One example of a commercially available ceramic substrate which may be used in the present invention is sold by Kyocera. It is expected that ceramic substrates in general which have been lapped after firing to achieve the desired flatness and roughness could be used.

Figure 3:
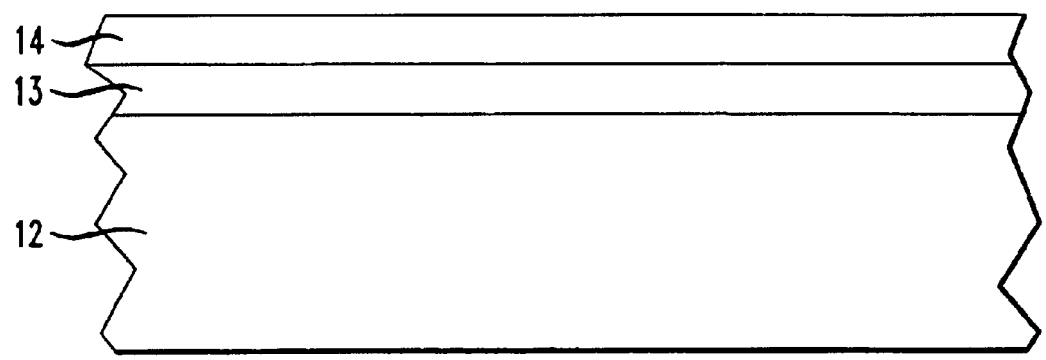
FIGS. 3–7 are cross sectional views of a portion of a device during various stages of fabrication in accordance with an embodiment of the invention.

FIGS. 3–7 illustrate various stages in the fabrication of a device in accordance with an embodiment of the method aspects of the invention. FIG. 3 illustrates a portion of the silicon wafer, 12, with the layers, 13 and 14, formed thereon.

Figure 4:
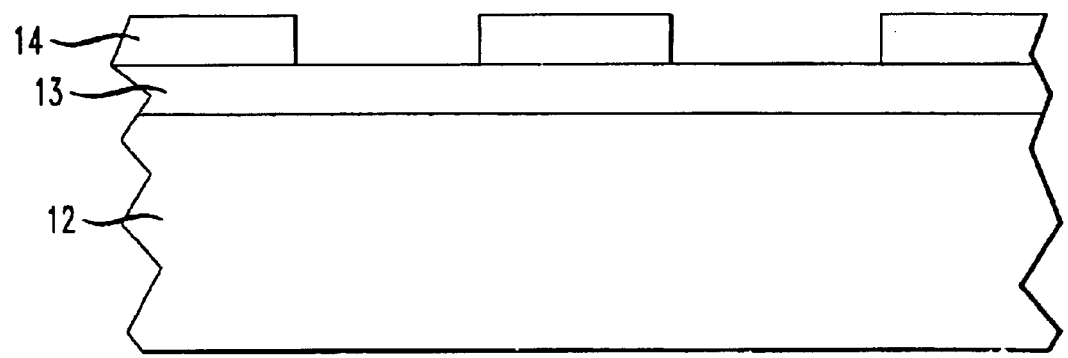

As illustrated in FIG. 4, the silicon layer, 14, is selectively etched in a pattern so as to define the positions of the mirrors and any supporting structures for the mirrors, the latter not being visible in this view. The etching can be done by standard photolithographic techniques to form a mask (not shown), and then etching, for example, using standard reactive ion etching techniques.

Figure 5:
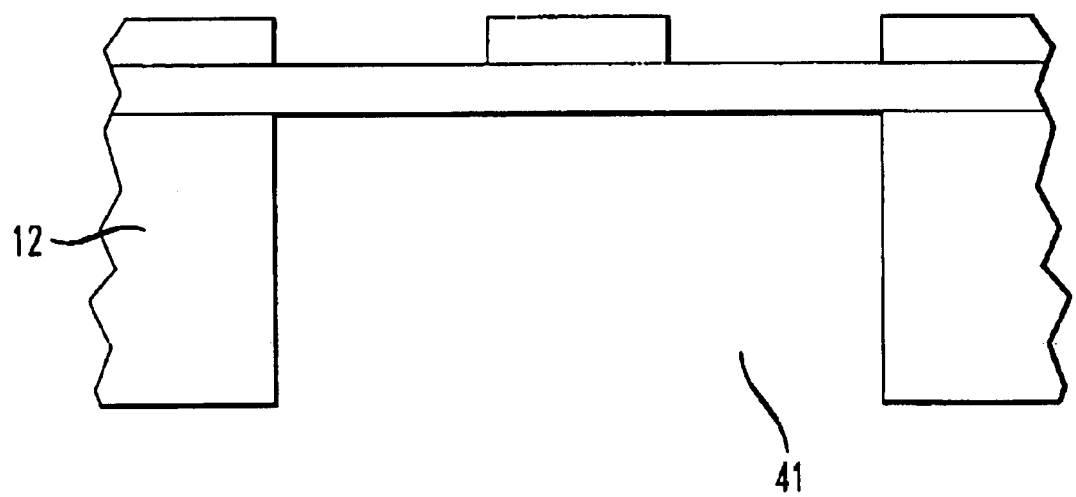

Next, as illustrated in FIG. 5, the wafer, 12, is selectively etched to form the cavities, e.g., 41, which will enclose the mirrors. This etch can also be performed using standard photolithography and reactive ion etching.

Figure 6:
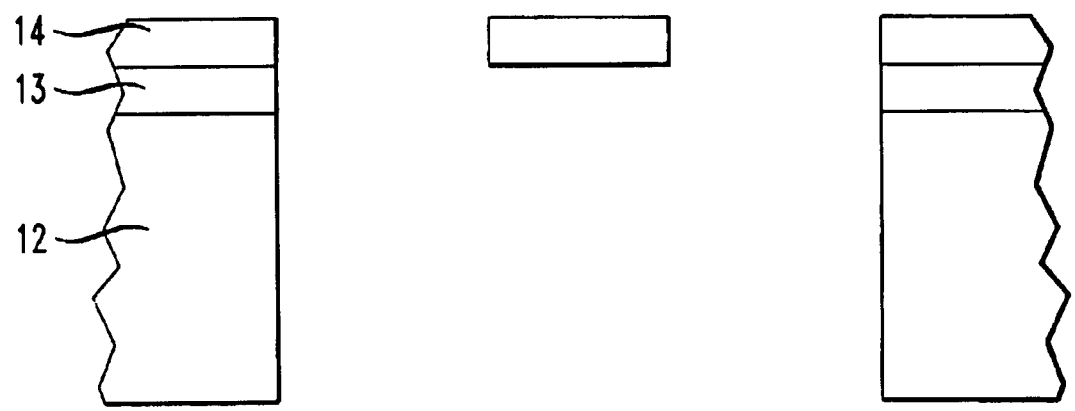

As illustrated in FIG. 6, the oxide layer, 13, can then be selectively etched in the areas not covered by the remainder of the wafer, 12. This etch can be performed with a wet chemical etchant.

Figure 7:
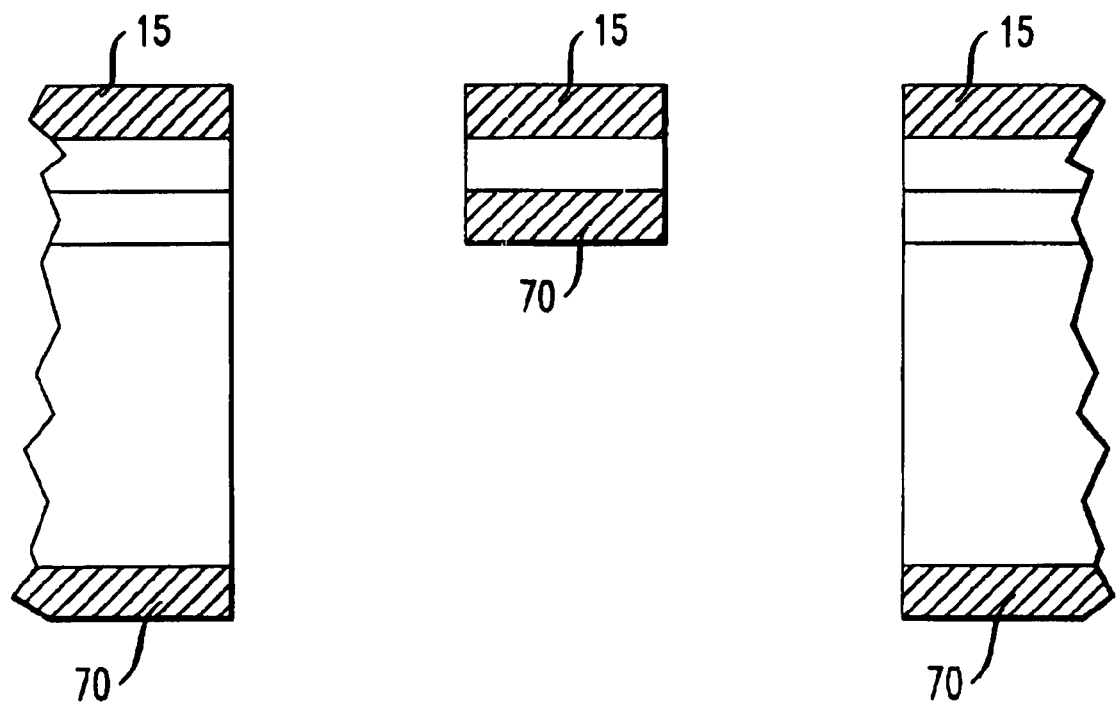

As illustrated in FIG. 7, a metal layer, 15, is deposited on the top surface of the resulting structure. A layer of metal, 70, is also deposited on the bottom surface of the structure including the mirror, 11, in order to balance the stresses in the mirror. The metal is typically Ti/Pt/Au and is typically deposited by standard metal evaporation techniques.

The spacer layer, 16, is selectively formed on the top surface of the ceramic substrate, 17, by photolithographic techniques.

The structure of FIG. 7 is then inverted and bonded to the spacer layer on the commercially available ceramic substrate to give the final structure illustrated in FIG. 1. Bonding can be done with a commercially available epoxy, a solder, or by partial curing of the spacer layer using standard bonding techniques. (Alternatively, the spacer layer could be deposited on the metal layer 15.)

While the invention has been described for devices using rotatable mirrors, it should be appreciated that it could be applicable to any device employing electrostatically activated MEMs members, such as diaphrams and cantilevered beams.

What is claimed:

1. A device comprising:
    an array of electrostatically activated members formed in a layer comprising silicon; and
    a substrate comprising a ceramic material and including conductors formed on a major surface thereof and in via holes formed therethrough the conductors being positioned with respect to and separate from the silicon layer so as to selectively operate the array of members using an electrostatic force such that the utilization of conductors on the silicon layer is not required.

2. The device according to claim 1 wherein the members are rotatable mirrors.

3. The device according to claim 2 wherein the mirrors are adapted to rotate about at least two axes.

4. The device according to claim 1 wherein the array comprises a structure of at least eight members by at least ten members.

5. The device according to claim 1 wherein the array is separated from the ceramic substrate by a spacer layer.

6. The device according to claim 1 further comprising a layer of metal on a major surface of the silicon layer.

7. The device according to claim 1 wherein the ceramic substrate comprises aluminum nitride (AlN).

8. The device according to claim 1 wherein the substrate has a flatness of less than or equal to 10 microns.

9. The device according to claim 1 wherein the substrate has a surface roughness of less than or equal to 1 micron.

10. The device according to claim 1 wherein the conductors have a line width of less than 2 microns and a spacing less than 2 microns.

11. The device according to claim 1 wherein the conductors positioned to operate one member from the array of electrostatically activated members comprise an array of at least four conductors extending through separate via holes.

12. A device comprising:
    an array of at least 8×10 mirrors rotatable about at least two axes formed in a layer comprising silicon;
    a spacer layer formed over a surface of the silicon layer; and
    a substrate comprising a ceramic material having a flatness of less than or equal to 10 microns and a surface roughness of less than or equal to 1 micron, said substrate including conductors formed on a major surface thereof and in via holes formed therethrough, the conductors being positioned with respect to the silicon layer so as to selectively operate the array of mirrors using an electrostatic force, wherein the conductors remain separated from said silicon layer and are positioned to operate a mirror comprise an array of at least four conductors extending through separate via holes.

13. A method of forming a device comprising:
    forming an array of electrostatically activated members in a layer of silicon; and
    mounting said silicon layer over a substrate comprising a ceramic material which includes conductors formed on a major surface of the substrate and in via holes formed in the substrate, the silicon layer being mounted so as to position the members with respect to the conductors to permit selective operation of the members.

14. The method according to claim 13 wherein the members are movable mirrors.

15. The method according to claim 13 wherein the silicon layer is mounted using an epoxy bond.

16. The method according to claim 13 wherein the silicon layer is mounted using a solder bond.

17. The method according to claim 13 wherein a spacer layer is included between the silicon layer and the ceramic substrate.

* * * * *